(12) United States Patent
Tapster

(10) Patent No.: US 8,693,685 B2
(45) Date of Patent: Apr. 8, 2014

(54) QUANTUM CRYPTOGRAPHY APPARATUS

(75) Inventor: Paul Richard Tapster, Worcestershire (GB)

(73) Assignee: Qinetiq Limited (GB)

( * ) Notice: Subject to any disclaimer, the term of this patent is extended or adjusted under 35 U.S.C. 154(b) by 1125 days.

(21) Appl. No.: 12/306,969

(22) PCT Filed: Jul. 4, 2007

(86) PCT No.: PCT/GB2007/002492
§ 371 (c)(1),
(2), (4) Date: Dec. 30, 2008

(87) PCT Pub. No.: WO2008/003960
PCT Pub. Date: Jan. 10, 2008

(65) Prior Publication Data
US 2009/0196419 A1    Aug. 6, 2009

(30) Foreign Application Priority Data
Jul. 5, 2006 (GB) ................................ 0613319.3

(51) Int. Cl.
| H04K 1/00 | (2006.01) |
| H04L 29/06 | (2006.01) |
| G06F 1/00 | (2006.01) |
| H04L 9/08 | (2006.01) |
| H04L 9/12 | (2006.01) |

(52) U.S. Cl.
CPC ................ H04L 9/0852 (2013.01); H04L 9/12 (2013.01); H04L 7/008 (2013.01)
USPC ............................. 380/255; 713/150; 713/500

(58) Field of Classification Search
CPC ... H04L 9/0852; H04L 9/0855; H04L 9/0858; H04L 7/00; H04L 7/0008; H04L 7/0075
USPC ......... 713/150–153, 160–161, 375, 400–401, 713/500; 380/255–256, 259–263, 268, 270, 380/31, 33, 274, 36
See application file for complete search history.

(56) References Cited

U.S. PATENT DOCUMENTS 5,673,133 A * 9/1997 Imaoka et al. ................ 398/202
6,580,537 B1 * 6/2003 Chang et al. .................... 398/79

(Continued)

FOREIGN PATENT DOCUMENTS

| EP | 1 091 240 | 4/2001 |
| GB | 2397452 | 7/2004 |
| WO | WO 94/15422 | 7/1994 |
| WO | WO 00/55706 | 9/2000 |

OTHER PUBLICATIONS

Buller et al., "A Short Wavelength GigaHertz Clocked Fiber-Optic Quantum Key Distribution System", IEEE Journal of Quantum Electronics, vol. 40, No. 7, Jul. 2004, pp. 900-908.

(Continued)

*Primary Examiner* — Darren B Schwartz
(74) *Attorney, Agent, or Firm* — McDonnell Boehnen Hulbert & Berghoff LLP

(57) ABSTRACT

A timing and synchronization apparatus and method for a quantum cryptography system is disclosed. A gating pulse is generated by a clock and synchronized to the receipt of transmitted photons at the detector. The apparatus is arranged to only accept photon detection events occurring during the gating period.

24 Claims, 1 Drawing Sheet

(56) References Cited

U.S. PATENT DOCUMENTS

| | | |
|---|---|---|
| 7,627,126 B1* | 12/2009 | Pikalo et al. .................. 380/279 |
| 2003/0048497 A1* | 3/2003 | Cotter et al. .................. 359/109 |
| 2003/0169880 A1* | 9/2003 | Nambu et al. ................. 380/256 |
| 2003/0231771 A1* | 12/2003 | Gisin et al. ................... 380/255 |
| 2004/0136535 A1* | 7/2004 | Takeuchi ...................... 380/256 |
| 2004/0139132 A1 | 7/2004 | Lutkenhaus et al. |
| 2004/0161109 A1* | 8/2004 | Trifonov ....................... 380/277 |
| 2004/0190725 A1 | 9/2004 | Yuan et al. |
| 2005/0078827 A1* | 4/2005 | Tajima .......................... 380/256 |
| 2005/0180575 A1* | 8/2005 | Maeda et al. ................. 380/278 |
| 2005/0184887 A1 | 8/2005 | Jaffe et al. |
| 2005/0190921 A1* | 9/2005 | Schlafer et al. .............. 380/278 |
| 2006/0034615 A1 | 2/2006 | Vig et al. |
| 2006/0064626 A1* | 3/2006 | Fischer et al. ................ 714/776 |
| 2007/0009098 A1* | 1/2007 | Tanaka et al. ................. 380/30 |
| 2007/0133799 A1* | 6/2007 | Vig et al. ...................... 380/256 |
| 2007/0183593 A1* | 8/2007 | Yoshida et al. ................ 380/28 |
| 2009/0013019 A1 | 1/2009 | Tapster |

OTHER PUBLICATIONS

Bienfang, et al., "Quantum Key Distribution with 1.25 Gbps Clock Synchronization", Optics Express, vol. 12, No. 9, May 3, 2004.
Examination Report dated Oct. 18, 2012 issued by the Japanese Patent Office in Japanese Patent Application No. JP2009-517425.
Kaji, et al., "Evaluation of Key Rates in Unconditionally Secure Quantum Key Distribution Taking Account of the After-Pulse Effect of Single Photon Detectors", The Transactions of the Institute of Electronics, Information and Communication Engineers C, Japan, Nov. 1, 2003, vol. J86-C, No. 11, pp. 1136-1142, retrieved from http://ci.nii.ac.jp/els/110003172065.pdf?id=ART0003589043&type=pdf&lang=jp&host=cinii&order_no=&ppv_type=0&lang_sw=&no=1347270470&cp=>.

* cited by examiner

US 8,693,685 B2

QUANTUM CRYPTOGRAPHY APPARATUS

BACKGROUND OF THE INVENTION (1) Field of the Invention

The present invention relates to quantum cryptography (QC) apparatus and to a method of operating such apparatus. In particular, the invention relates to an apparatus and a method for synchronising the transmitter and receiver portions of a QC system.

(2) Description of the Art

The purpose of cryptography is to transmit information in such a manner that access to it is restricted entirely to the intended recipient(s). Cryptography thus allows sensitive information to be securely transmitted over public channels, such as the internet or mobile telephone networks, even if the transmission itself is received by others.

In the early days of cryptography, the security of encrypted information depended on the secrecy of the encryption and decryption procedures. However, it is now common practise to use ciphers in which the information to be encrypted (often termed the "plaintext") and a "key" are supplied to an encryption algorithm. In such a secret key arrangement, the encryption and decryption algorithms are publicly announced and the security of the system depends entirely on the secrecy of the key. The main practical problem associated with such a secret key system is the secure distribution of the keys.

Quantum cryptography is also known and a QC system generally comprises a transmitter and a receiver, typically designated "Alice" and "Bob" respectively, that are linked by a quantum channel and a traditional (e.g. public) channel. The quantum channel is used to establish identical random number keys at the transmitter and receiver and takes advantage of the fact that, according to Heisenberg's uncertainty principle, the measurement of a quantum state will generally disturb that state. Once the secret key has been distributed using the quantum channel, encrypted information can be securely passed between Alice and Bob over the public channel.

In typical quantum communication techniques, Alice is arranged to produce a stream of single photons that are modulated randomly to one of a number of polarisation states (e.g. 0, 45, 90 or 135). Each photon can thus carry a bit of quantum information, which is often termed a qubit. Bob is arranged to measure the photons received from Alice using a random sequence of polarisation bases (e.g. a rectilinear basis and a diagonal basis). Bob then tells Alice over the public channel the bases used in the measurement and Alice then informs Bob, again over the public channel, the bases that were correctly chosen. Bob is then able to discard all the measurements where the polarisation base he used to measure the received photon does not match the polarisation base used by Alice to modulate the photon. In this manner, Bob and Alice only disclose the polarisation bases used for each measurement and are left with perfectly matching strings of bits without disclosing the results of the measurements.

An eavesdropper, typically termed Eve, attempting to gain information about the key by intercepting photons transmitted from Alice to Bob has no way of knowing the polarisation state applied to each photon by Alice. Eve must therefore randomly choose bases for her measurements and has no way of knowing, and thus cannot accurately recreate, the polarisation state of the photons transmitted by Alice. An eavesdropper will thus unavoidably corrupt the information passed to Bob by the act of measuring the polarisation of the photons transmitted by Alice. Alice and Bob can thus, as a check, choose some bits at random to reveal to one another. If the bits agree, they can use the remaining bits with the assurance they have not been intercepted. However, if they find a substantial number of discrepancies it indicates the presence of an eavesdropper and the key is discarded. The use of Quantum communication thus allows a secret key to be communicated with total security.

Following the above it can be seen that, in order for a QC system to operate effectively, it is preferably for each detection event to be matched with the corresponding transmission event. In other words, the system should be arranged so that Bob knows when a single photon pulse is expected to arrive from Alice. To reduce the impact of false detections arising from noise, the receiver of a QC system is thus typically gated so that detection events are discarded unless they occur within a period of time in which reception of a photon from the transmitter is expected.

Previously, gating of the receiver has been achieved by using a so-called "bright pulse" scheme. In such a scheme the single photon pulse is mixed with a bright pulse of a different wavelength. The receiver comprises a dichroic filter to separate the bright pulse from the single photon pulse. The bright pulse is passed to a detector (which is quite separate to the single photon detector used to detect the weak pulse) and arrival of the bright pulse is used to determine the expected arrival time of the weak pulse. However, the implementation of such a scheme adds to the complexity, and cost, of both the transmitter and receiver portions of a QC system.

SUMMARY OF THE INVENTION

It is an object of the present invention to provide QC apparatus, and a method of operating such apparatus. It is a further object of the invention to provide improved QC apparatus, and a method of operating such apparatus, that mitigates at least some of the disadvantages associated with QC systems of the type described above.

According to a first aspect of the present invention, a quantum cryptographic receiver is provided for receiving a series of photon pulses, the receiver comprising at least one photon detector and gating means to generate a gating signal for periodically gating said receiver, characterised in that the gating means comprises a first electronic clock for generating a first timing signal and in that said gating signal is derived from said first timing signal.

A QC receiver is thus provided in which the receiver can be gated so as to only accepts photon detections during time intervals when the arrival of a photon pulse from an associated QC transmitter is expected. This is achieved using a timing signal derived from an electronic (e.g. quartz) clock and thus does not require a bright pulse to accompany each single photon pulses; i.e. the use of a prior art "bright pulse" scheme of the type described above is avoided. Avoiding the use of a bright pulse scheme has the advantage of reducing the complexity of both the QC transmitter and receiver thereby making the QC system cheaper, and less complex, to fabricate.

Preferably, the gating signal has a period substantially equal to the time interval between the arrival of successive photon pulses at the receiver. The gating signal conveniently comprises a series of gating pulses, said receiver being arranged to accept only those photon detection events that occur during a gating pulse. In other words, the receiver is only sensitive to photons that arrive at the receiver when the gating pulse is applied. It should be noted that the term "gating pulse" as used herein means a time interval during which the gating signal is held at a particular voltage trigger level; the gating pulse may thus comprise a spike, or a dip, in the voltage of the gating signal.

Advantageously, the period of the gating signal is at least ten, at least one hundred or at least one thousand times greater than the duration of each gating pulse. In this manner, detection events not associated with the receipt of a single photon pulse from the QC transmitter can be discounted thereby increasing the signal to noise ratio of the system. However, shorter duration gating pulses obviously require a more accurate prediction of the expected arrival time of a photon pulse. The duration of the gating pulse relative to the period of the gating signal may be varied during use; i.e. the gating pulse width may be reduced or increased if required.

Conveniently, the gating means comprises a phase adjuster for generating the gating signal from the timing signal, said phase adjuster being arranged to provide a variable phase lag between the gating signal and the first timing signal. The gating signal may be a delayed version of the first timing signal. Furthermore, the phase adjuster may be arranged to minimise the difference between the phase of the gating signal and the phase of detection events associated with the arrival of photon pulses at said at least one detector. The phase adjuster may continually adjust the applied phase lag during operation to ensure continued synchronisation of the gating signal with expected photon pulse arrival times. A convenient way to implement such a scheme comprises a phase locked loop arrangement.

Advantageously, the receiver is arranged to receive a series of photon pulses that are preceded by a header block of photon pulses encoding a predetermined pseudo-random bit sequence, wherein said phase adjuster is arranged to use detection events associated with said header block to synchronise the absolute phase of the gating signal with the phase of detection events arising from the detection of the series of photon pulses. The use of such a header block enables identification of the gating pulse which corresponds to the first pulse emitted by the system. In other words, the header block ensures that Bob knows which photon pulse he has just received from Alice.

The receiver conveniently comprises at least two pairs of photon detectors, wherein each pair of photon detectors comprises an associated polarisation filter. A beam steering element can also be advantageously included for directing each photon pulse arriving at the receiver to the polarisation filter associated with one of said at least two pairs of photon detectors. In this manner received photons may be directed to any one of two or more receive channels that comprises a polarisation filter (e.g. an appropriately orientated linearly polarising beam splitter) and a pair of photon detectors. Each receive channel may thus be arranged to measure photon polarisation using a certain polarisation basis (e.g. rectilinear, diagonal, circular bases etc) and the beam steering element randomly directs incident photon pulses to one of said receive channels. In this manner, the receiver is arranged to make measurements using any one of at least two different polarisation bases.

The generation of a single photon pulse by an associated QC transmitter typically requires the receiver to comprise a single photon detector (i.e. a detector that is capable of detecting single photon events). In such a truly single photon system eavesdropping is physically impossible due to the laws of quantum mechanics. However, it should be noted that each photon pulse produced by a transmitter may contain a plurality of photons without significantly affecting the security of the system. In other words, a QC transmitter may be provided that produces a photon pulse having a very low intensity (i.e. it comprises a small number of photons). In such a case, a single photon detector is preferred but is not essential.

In one embodiment, the at least one detector is electronically gateable such that the at least one detector only outputs photons detection events which occur when a gating signal is applied. In this case the gating signal is thus directly applied to the at least one single photon detector. In such a case, the gating signal sensitises the single photon detector to incident photons only when required. Alternatively, a gating arrangement could be employed in which the at least one detector is continually sensitive to photons but a mechanical or electro-optic shutter arrangement is provided to expose the detector to incident radiation only on receipt of the gating signal. The skilled person would be aware of the numerous gating devices that could be used in a receiver of the present invention. Preferably however the gating is applied in software. Thus the at least one detector is continually sensitive to photons and all detection events are recorded along with their arrival times. A processor then compares the arrival times with the timing of the gating pulse and accepts or rejects events depending on whether they occur within the gate time.

Preferably, the receiver comprises data output means for providing an output signal that indicates the occurrence of a detection event. In the case of a multiple detector system, the particular detector which records an event provides information about the polarisation state of the received photon.

According to a second aspect of the invention, quantum cryptographic apparatus is provided that comprises a receiver according to the first aspect of the invention and a transmitter, said transmitter comprising a photon pulse generation module and a second electronic clock, wherein the photon pulse generation module is arranged to generate a series of photon pulses that are separated by an interval derived from a second timing signal produced by said second electronic clock. QC apparatus of this type thus enables a secure quantum channel to be established between two locations over which cryptographic keys can be distributed in the manner described above. A standard communication channel may also be provided to link the transmitter and receiver.

Advantageously, the frequency of the second timing signal produced by the second electronic clock is substantially equal to the frequency of the first timing signal produced by the first electronic clock. For example, the first and second electronic clocks may be substantially identical temperature stabilised quartz clocks.

Conveniently, the photon pulse generation module is arranged to produce photon pulses polarised in any one of at least two polarisation bases. In this manner, a stream of photon pulses may be produced that are encoded using different, randomly selected, polarisation bases.

The transmitter advantageously comprises a random number generator for generating the random encryption key. For example, it may comprise a random number generator of the type described in our co-pending patent application GB0603523.2.

Preferably, the transmitter is arranged to generate a series of photon pulses that are preceded by a header block of photon pulses encoding a predetermined pseudo-random bit sequence. As described above, the use of such a header block enables synchronisation of the transmitter and receiver.

According to a third aspect of the invention, a transmitter for a quantum cryptography system consists of at least one laser, wherein the at least one laser is a single photon laser. A transmitter is thus provided that only comprises lasers for generating weak (e.g. single photon) pulses and does not include any high powered lasers that would be necessary to implement a "bright pulse" scheme.

According to a fourth aspect of the invention, a method of receiving a quantum cryptography signal comprises the steps of; (i) taking at least one photon detector, (ii) generating a gating signal to gate said at least one photon detector, and (iii) using said at least one photon detector to detect a series of received photon pulses, characterised in that step (ii) comprises generating said gating signal from a first timing signal derived from a first electronic clock.

Conveniently, the step (ii) of generating the gating signal comprises the step of imparting a delay to the first timing signal. For example, a phase adjuster may be used to provide the required delay. Furthermore, step (ii) may comprise the step of forming a phase locked feedback loop to synchronise gating of the at least one photon detector with the arrival of photon pulses at the least one photon detector.

Advantageously, prior to step (iii), said at least one photon detector may be arranged to detect a header block of photon pulses encoding a predetermined pseudo-random bit sequence. Step (iii) may conveniently comprise detecting each of the series of photon pulses using one of at least two polarisation bases. Two or more different detection channels may be used to make such measurements.

Conveniently, the step (ii) of generating a the gating signal from the first timing signal is performed using a suitably programmed computer. In other words, a computer is provided that is suitably programmed to receive the first timing signal and any detection event signals output by the at least one photon detector. The computer then establishes a phase locked loop so that the gating signal gates the detector(s) when a detection event is expected. A computer program for implementing the present invention may also be provided.

According to a fifth aspect of the invention, a method of QC communication comprises the steps of (a) transmitting a QC signal comprising a series of photon pulses and (b) receiving the QC signal using the method of the fourth aspect of the invention.

DESCRIPTION OF THE FIGURES

The invention will now be described, by way of example only, with reference to the following drawings in which.

DESCRIPTION OF THE INVENTION

Figure 1:
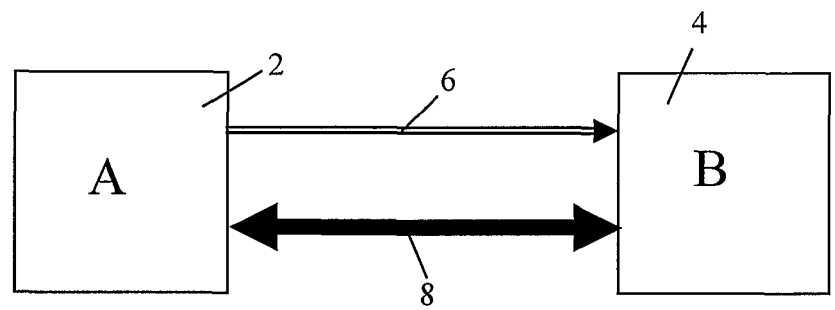
FIG. 1 shows QC apparatus of the present invention.

Referring to FIG. 1, a QC system comprising a transmitter "Alice" 2 and a receiver "Bob" 4 is shown. The transmitter 2 and receiver 4 are connected by a one-way quantum channel 6 and a standard, two-way, communication channel 8.

Figure 2:
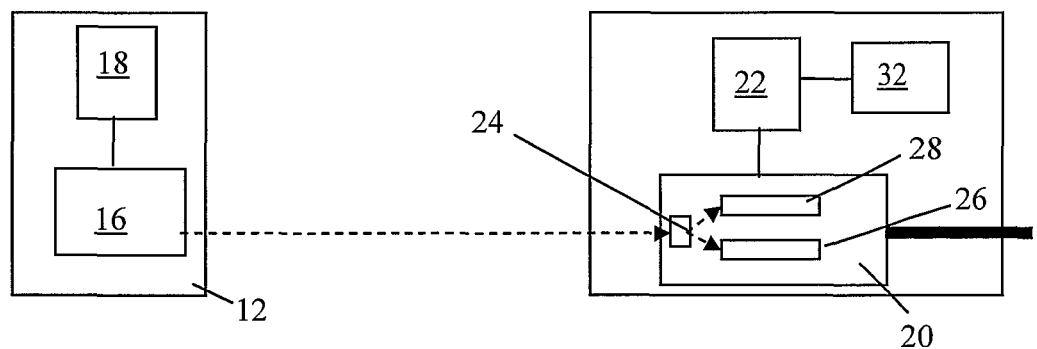
FIG. 2 shows the quantum channel of QC apparatus of the present invention.

Referring to FIG. 2, the apparatus used to form the quantum channel 6 of the quantum cryptography apparatus of FIG. 1 is shown. In particular, Alice 2 comprises a quantum transmitter 12 and Bob 4 comprises a quantum receiver 14.

The quantum transmitter 12 comprises a quantum pulse generator 16 that is arranged to produce a polarised single photon pulse when a trigger signal is supplied by a first clock 18. The single photon pulse produced by the quantum pulse generator 16 may have any one of four polarisation states. In this example, each single photon pulse may be polarised using a rectilinear basis (i.e. it may be linearly polarised at 0° or 90°) or using a diagonal basis (i.e. it may be linearly polarised at 45° or 135°). The quantum pulse generator 16 may thus comprise four single photon sources that each have an appropriately orientated polariser element. The quantum pulse generator 16 also comprises an optical arrangement (not shown) for combining the output of each of the four single photon sources so that any photons output from the transmitter pass along a common optical path to the quantum receiver 14.

Although such an quantum pulse generator arrangement provides a convenient way of producing the single photon stream, the skilled person would appreciate the numerous alternative quantum pulse generation techniques that could alternatively be applied. Similarly, the skilled person would recognise that any two or more mutually exclusive polarisation bases could be used instead of the rectilinear and diagonal bases described in this example.

In use, the quantum pulse generator 16 receives a series of random binary data bits such as those produced by a random number generator (not shown). A random number generator suitable for such a task is described in our co-pending GB patent application GB0603523.2. The quantum pulse generator 16 encodes each random bit of information using a randomly selected polarisation basis; the randomness of the basis selection may again be achieved using the output from the random number generator. The single photon pulses output by the quantum pulse generator 16 are generated at regular intervals on receipt of a trigger signal from the first clock 18.

As an example, each bit of the binary stream "0-1-0-1-1" may be encoded using randomly selected bases "D-R-R-D-R" where R refers to the rectilinear basis and D refers to the diagonal basis. In such an example, the binary stream would be converted by the quantum pulse generator into a series of single photon pulses having linearly polarised states of "45°-90°-0°-135°-90°". This assumes that a binary "0" is represented by 0° and 45° polarisation states in the rectilinear and diagonal polarisation bases respectively. The transmitter software reads two bits from the random number generator and uses these to determine which of one of the four output lines to pulse to activate the correct laser diode. Each single photon pulse would be separated from the preceding and subsequent pulse by a fixed time interval determined by the period of the trigger signal produced by the first clock 18.

Bob's quantum receiver 14 comprises a single photon detection module 20 that is gated by a gating signal provided by a processor 22. The single photon detection module 20 comprises a beam steering element 24 to direct received photon pulses to either one of a rectilinear basis channel 26 and a diagonal basis channel 28. The processor 22 may apply a gating signal to the single photon detectors (not shown) of both the rectilinear basis channel 26 and the diagonal basis channel 28. The single photon detectors are thus only sensitised to incident photon during periods in which the gating signal is applied. Alternatively each detection event may be recorded by the single photons detectors and the arrival time of each pulse recorded. The gating is then applied by a processor such that only detection events occurring within the time of the gate are accepted.

The processor 22 is arranged to receive a clocking signal from a second clock 32. The first clock 18 of the quantum transmitter and the second clock 32 of the receiver are high accuracy, temperature controlled, quartz clocks that each have an output frequency of 10 MHz. The clocks are arranged to have frequencies that differ by only a few tenths of one Hertz. A high stability oscillator such as a CFPO-4A1 high stability oven controlled crystal oscillator made by C-MAC Frequency Products, would be suitable for the clock.

The processor 22 runs software that maintains a third "software" clock that is derived from the timing pulses of the second clock 32. The third clock is initially synchronised with the second clock 32, but a delay is then imparted to enable the third clock to be synchronised with the first clock 18 of the transmitter. In this manner, the first clock of the transmitter runs at substantially the same frequency as the third clock of the receiver but with a phase difference that compensates for the transmission delay between the transmitter and receiver and the frequency difference between first clock 18 and second clock 32.

In order to synchronise the third clock with the first clock, the processor is arranged to accumulate single photon detection events recorded by the single photon detection module over a ten millisecond time interval. The time difference between each detection event and the nearest timing event of the third clock is termed the "detection phase" and is averaged over the time interval. The phase of the third clock relative to the second clock is then changed in an attempt to make the detection phase in the next ten millisecond time interval closer to zero. Iteratively repeating this process for approximately ten seconds allows the third clock to become an accurate copy of the transmitter clock (with the appropriate phase shift to compensate for the transmission delay between the transmitter and receiver).

It has been found that the above technique allows the arrival time of a photon to be predicted to an accuracy of about one nanosecond. This accuracy allows the single photon detection module 20 to be gated so as to reject the majority of the background events. In particular, it has been shown that two 1.4 ns gates selected from a 100 ns transmission period will reduce the background detection rate by a factor of seventy.

The skilled person will of course realise that other durations and frequencies can be used by selecting appropriate components. For instance the invention has been implemented using clocks with a frequency of 20 MHz in conjunction with a 1.1 ns gate width.

In use, the beam steering element 24 of the single photon detection module 20 is arranged to pass each pulse received from the transmitter to one of the rectilinear basis channel 26 and the diagonal basis channel 28. Taking the example given above, the series of single photon pulses generated by Alice using polarisation bases "D-R-R-D-R" may be directed to randomly selected channels "D'-R'-D'-R'-R" wherein R' is the rectilinear basis channel 26 and D' is the diagonal basis channel 28. Alice and Bob can then use the two-way communication channel 8 to determine when Bob measured a photon pulse using the same polarisation base that Alice used to generate the photon. In this example, Alice and Bob's polarisation bases matched for the first, second and fifth photon pulses and hence Bob would have correctly decoded the first, second and fifth data bits of the binary data stream.

In order to ensure each detection event is correlated with the correct transmission even, the specific clock cycle that corresponds to the first pulse leaving the transmitter can also be identified. This is done by sending a header block of information before the normal cryptography transmission. The intensity of the header block is maximised by using all four transmitter channels at the same time. The transmitter is modulated with a pseudo random bit sequence (PRBS) and the receiver correlates the detection events with the same sequence to determine the start of transmission time. The header block has a duration of 110 ms to ensure that a reasonable number of detection events are received in that time. It has been found that rather than transmitting a single PRBS at 10 MHz with a period of 10 ms it is preferable to use two separate sequences. The first sequence has a period of 51.1 µs and the second sequence has a period of 102.3 µs. Combining the two sequences allows the start of the header to be identified with a resolution of 100 ns and an effective period of 52 ms. A third PRBS with a period of 204.7 µs is used to check the correct operation of the whole process.

The invention claimed is:

1. A quantum cryptographic receiver comprising;
at least one photon detector; and
gating means to generate a gating signal for periodically gating said receiver, characterized in that the gating means comprises a first electronic clock for generating a first timing signal and in that said gating signal is derived from said first timing signal wherein the gating means comprises a phase adjuster for generating the gating signal from the first timing signal, said phase adjuster being arranged to provide a variable phase lag between the gating signal and the first timing signal wherein said receiver receiving a series of photon pulses that are preceded by a header block of photon pulses encoding a predetermined pseudo-random bit sequence and wherein said phase adjuster is arranged to use detection events associated with said header block to synchronize the absolute phase of the gating signal with the phase of detection events arising from the detection of the series of photon pulses.

2. The receiver according to claim 1 wherein said gating signal has a period substantially equal to the time interval between the arrival of successive photon pulses at the receiver.

3. The receiver according to claim 2 wherein said gating signal comprises a series of gating pulses, said receiver being arranged to only accept those photon detection events that occur during a gating pulse.

4. The receiver according to claim 3 wherein the period of the gating signal is at least ten times greater than the duration of each gating pulse.

5. The receiver according to claim 1 wherein the phase adjuster is arranged to minimize the difference between the phase of the gating signal and the phase of detection events associated with the arrival of photon pulses at said at least one detector.

6. The receiver according to claim 5 wherein the phase adjuster comprises a phase locked loop.

7. The receiver according to claim 1 that comprises at least two pairs of photon detectors, wherein each pair of photon detectors comprising an associated polarization filter.

8. The receiver according to claim 7 and further comprising a beam steering element for directing each photon pulse arriving at the receiver to the polarization filter associated with one of said at least two pairs of photon detectors.

9. The receiver according to claim 1 wherein said at least one photon detector is a single photon detector.

10. The receiver according to claim 1 wherein the gating signal is directly applied to the at least one single photon detector.

11. The receiver according to claim 1 that comprises data output means for providing an output signal that indicates the occurrence of a detection event.

12. Quantum cryptographic apparatus comprising:
a quantum cryptographic receiver for receiving a series of photon pulses that are preceded by a header block of photon pulses encoding a predetermined pseudo-random bit sequence, the receiver comprising at least one photon detector and gating means to generate a gating signal for periodically gating said receiver, characterized in that the gating means comprises a first electronic clock for generating a first timing signal and in that said gating signal is derived from said first timing signal wherein the gating means comprises a phase adjuster for generating the gating signal from the first timing signal, said phase adjuster being arranged to provide a variable phase lag between the gating signal and the first timing signal; and a transmitter, said transmitter comprising a photon pulse generation module and a second electronic clock, wherein the photon pulse generation module is arranged to generate a series of photon pulses that are separated by an interval derived from a second timing signal produced by said second electronic clock said phase adjuster is arranged to use detection events associated with said header block to synchronize the absolute phase of the gating signal with the phase of detection events arising from the detection of the series of photon pulses.

13. The quantum cryptographic apparatus according to claim 12 wherein the frequency of the second timing signal produced by the second electronic clock is substantially equal to the frequency of the first timing signal produced by the first electronic clock.

14. The quantum cryptographic apparatus according to claim 12 wherein the photon pulse generation module is arranged to produce photon pulses polarized in any one of at least two polarization bases.

15. The quantum cryptographic apparatus according to claim 12 wherein the transmitter comprising a random number generator.

16. The quantum cryptographic apparatus according to claim 12 wherein the transmitter is arranged to generate a series of photon pulses that are preceded by a header block of photon pulses encoding a predetermined pseudo-random bit sequence.

17. The quantum cryptographic apparatus according to claim 12 wherein a standard communication channel is provided to link the transmitter and receiver.

18. A method of receiving a quantum cryptography signal comprising the steps of;
   (i) taking at least one photon detector,
   (ii) generating a gating signal to gate said at least one photon detector, and
   (iii) using said at least one photon detector to detect a series of received photon pulses, characterized in that step (ii) comprises generating said gating signal from a first timing signal derived from a first electronic clock wherein the gating signal is generated from a first timing signal by a gating means including a phase adjustor, said phase adjustor being arranged to provide a variable phase lag between the gating signal and the first timing signal wherein the received photon pulses of step (iii) are preceded by a header block of photon pulses encoding a predetermined pseudo-random bit sequence, said phase adjustor is arranged to use detection events associated with said header block for synchronizing the absolute phase of the gating signal with a phase of detection events arising from detection of the series of photon pulses using detection events associated with said header block.

19. The method according to claim 18 wherein the step (ii) of generating the gating signal comprises the step of imparting a delay to the first timing signal.

20. The method according to claim 18 wherein step (ii) comprises the step of forming a phase locked feedback loop to synchronize gating of the at least one photon detector with the arrival of photon pulses at the least one photon detector.

21. The method according to claim 18 wherein the header block of photon pulses encode a predetermined pseudo-random bit sequence.

22. The method according to claim 18 wherein step (iii) comprises detecting each of the series of photon pulses using one of at least two polarization bases.

23. The method according to claim 18 wherein the step (ii) of generating the gating signal from the first timing signal is performed using a suitably programmed computer.

24. The method of claim 18 wherein the step of transmitting a quantum cryptography (QC) signal comprising a series of photon pulses is performed before receiving the QC signal.

* * * * *